United States Patent
Lee

(10) Patent No.: US 6,732,362 B1
(45) Date of Patent: May 4, 2004

(54) OBJECT-ORIENTED EXCHANGE MANAGING SYSTEM AND EXCHANGE RESOURCES INSTALLING METHOD

(75) Inventor: Sang-Sub Lee, Kyonggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 635 days.

(21) Appl. No.: 09/653,027

(22) Filed: Sep. 1, 2000

(30) Foreign Application Priority Data

Sep. 1, 1999 (KR) ........................................ 1999-36987

(51) Int. Cl.$^7$ ................................................ G06F 9/44
(52) U.S. Cl. ....................... 719/315; 719/310; 719/316
(58) Field of Search ........................ 707/103 R, 103 Y, 707/103, 103 Z, 102; 717/176; 709/313, 315; 719/313, 315, 310, 316

(56) References Cited

U.S. PATENT DOCUMENTS

| | | | |
|---|---|---|---|
| 5,870,611 A | * | 2/1999 | London Shrader et al. . 717/175 |
| 6,212,520 B1 | * | 4/2001 | Maruyama et al. ............ 707/10 |
| 6,327,594 B1 | * | 12/2001 | Van Huben et al. ........ 707/200 |
| 6,345,386 B1 | * | 2/2002 | Delo et al. .................... 717/176 |
| 6,505,211 B1 | * | 1/2003 | Dessloch et al. .............. 707/10 |
| 6,529,914 B1 | * | 3/2003 | Doan et al. ..................... 707/1 |
| 6,546,553 B1 | * | 4/2003 | Hunt .......................... 717/174 |

* cited by examiner

Primary Examiner—Thomas Lee
Assistant Examiner—The Thanh Ho
(74) Attorney, Agent, or Firm—Cha & Reiter, L.L.C.

(57) ABSTRACT

There are provided an object-oriented exchange managing system and an exchange resource installing method. In the object-oriented exchange managing system, a user interface processor interfaces data with an operator, and an IPC conversion processor interfaces data with exchanges. A scoping function processor analyzes the resource installation request message received from the operator through the user interface processor and determines the scope of a class to be processed from a base class which module the requested resources. A filtering function processor processes attribute values in accordance with an operator-requested condition in the class. A resource installation processor generates an object instance representative of information about the corresponding resources and transmits the object instance to a corresponding exchange through the IPC conversion processor. An object data base management system stores the object instance received from the resource installation processor.

5 Claims, 2 Drawing Sheets

OBJECT-ORIENTED EXCHANGE MANAGING SYSTEM AND EXCHANGE RESOURCES INSTALLING METHOD

CLAIM OF PRIORITY

This application makes reference to and claims all benefits accruing under 35 U.S.C. Section 119 from an application for "Object-Oriented Exchange Managing System and Exchange Resources Installing Method" filed in the Korean Industrial Property Office on Sep. 1, 1999 and there duly assigned Ser. No. 99-36987.

BACKGROUND OF THE INVENTION

1. Field of the Invention

The present invention relates generally to an exchange management system, and in particular, to a system for integrally managing a plurality of exchanges using an object-oriented technique and method for managing the installation of exchange resources.

2. Description of the Related Art

A switching system is generally coupled to manage different types of exchanges, such as an Asynchronous Transfer Mode (ATM) switching system, Time Division Switching System-10 (TDX-10), and Shared Secret Data System. The main processor in each exchange is responsible for the management of its own exchange, and this type of management is maintained and implemented as a sub-level function that is partly integrated with the call processing software feature in a conventional public network. When physical resources are added/reduced or a software function is modified in the exchange system, a relational database, which is configured in the form of a procedure program, is used to access and update data via a language interface.

Therefore, in a switching system having a plurality of exchanges, the management function of each exchange in a switching system can overburden the system and reduce the performance of the switching service. Moreover, the addition of a new function or an increase/decrease in the exchange resources can influence and interfere with other programs in the switching system, thereby impairing the normal operation of the switching system.

SUMMARY OF THE INVENTION

It is, therefore, an object of the present invention to provide an exchange managing system using an object-oriented technique, and a method for managing the installation of exchange resources.

The above object can be achieved by providing an object-oriented exchange managing system and a method for installing an exchange resource. In an object-oriented exchange managing system according to the present invention, a user interface processor interfaces data with an operator, and an ICP conversion processor interfaces data with a plurality of exchanges coupled to the exchange managing system. A Scoping Function Processor analyses a RESOURCE INSTALLATION REQUEST message received from the operator via the user interface processor and determines the scope of a class to be processed from a base class that defines protocols and functions of the requested resource. A Filtering Function Processor processes the property values, which defines the state of the object, in response to the operator-requested condition in the class. A Resource Installation Processor generates an object instance representative of the information about the corresponding resource and transmits the object instance to the corresponding exchange via the IPC conversion processor. An Object Data Base Management System (ODBMS) stores the object instance received from the Resource Installation Processor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
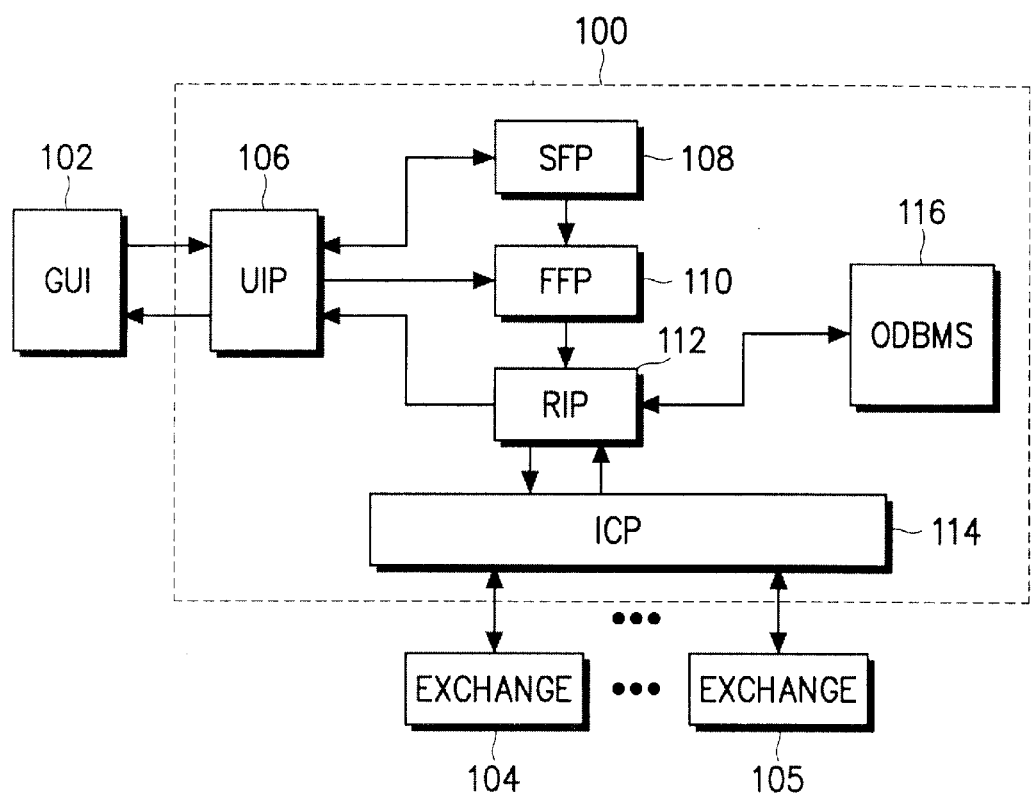
FIG. 1 is a block diagram of an exchange managing system according to the embodiment of the present invention; and, FIG. 2 is a flowchart illustrating an exchange resource installing method for the exchange managing system according to the embodiment of the present invention.

FIG. 1 depicts a block diagram of an exchange managing system for integrally managing a plurality of exchanges coupled thereto in accordance with the embodiment of the present invention. As a brief background, an object database management system (ODBMS) is one of the methodologies that exist presently for storage of data for use in computer system applications. The ODBMS fundamentally provides "concurrency control" so that users can share a database without interfering with each other or compromising the integrity of data. The ODBMS facilitates the storage of data and can manipulate object entities or "objects." The objects are data structures that represent a real-world concept or entities, and are associated in classes. Every property of an object has a property value called "attribute", which defines the state of the object. A class is a set of objects with similar attributes, and every managed object instance has a class association with it. Thus, an object is an instance of its class. That is, a class is a template of objects of similar nature.

With reference to FIG. 1, a User Interface Processor (UIP) 106 interfaces data between a Graphic User Interface (GUI) 102 and a managing system 100. A Scoping Function Processor (SFP) 108 analyzes an EXCHANGE RESOURCE REQUEST message received from an operator via the UIP 106 to determine the scope of a class to be processed from a base class. A Filtering Function Processor (FFP) 110 processes an attribute value within the class that satisfies the operator-requested condition. A Resource Installation Processor (RIP) 112 generates an object instance representative of information about the requested exchange resource and stores the object instance in an Object Data Base Management System (ODBMS) 116. The RIP 112 transmits the object instance to one of the exchanges 104 and 105 to which the resource is to be installed via an Inter-processor Communication Conversion Processor (ICP) 114. The ICP 114 processes IPC messages for interfacing data between the exchanges and the managing system.

Figure 2:
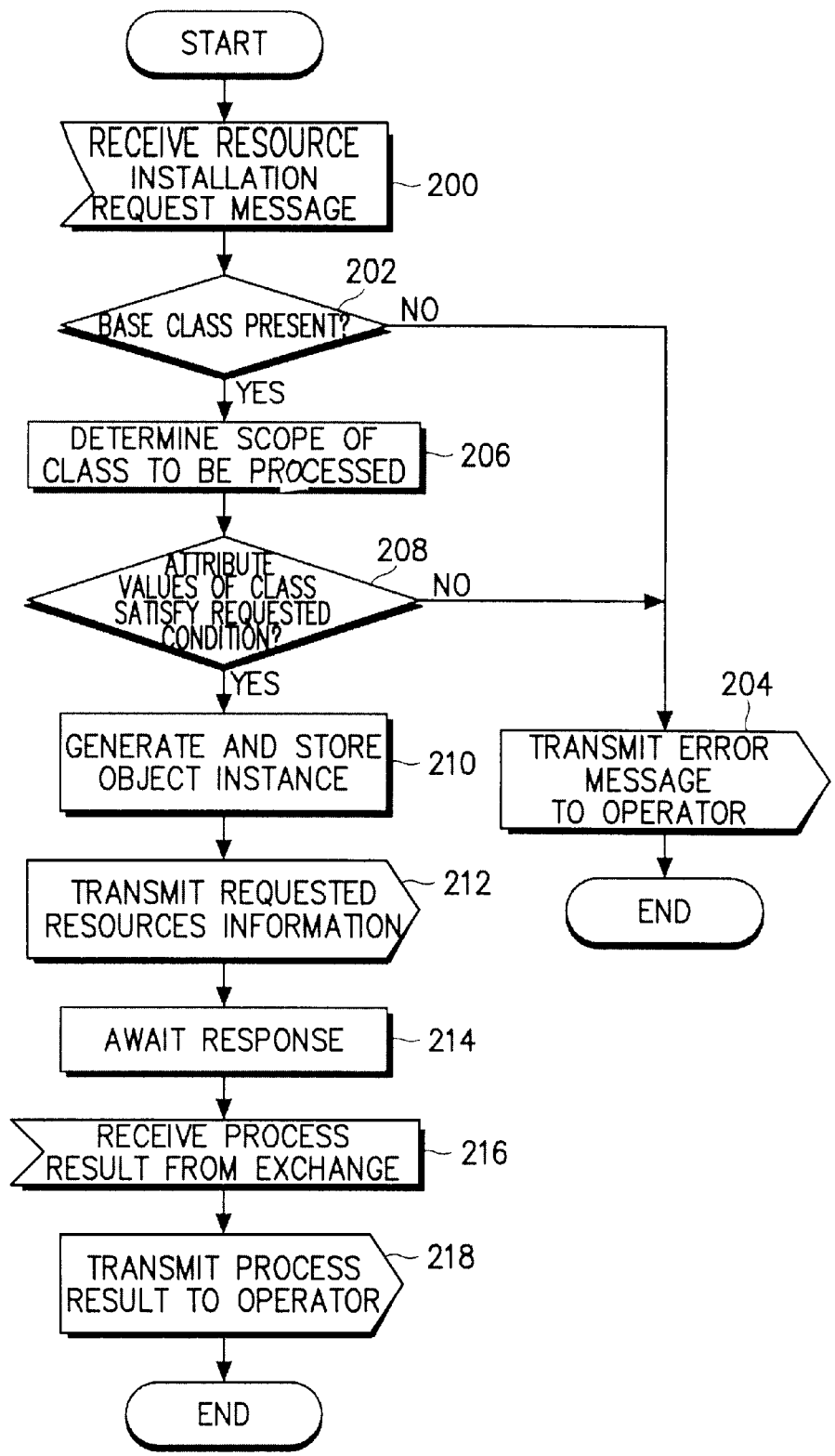

FIG. 2 depicts a flowchart, according to the embodiment of the present invention, illustrating a method for installing an exchange resource in the object-oriented exchange managing system.

With reference to FIGS. 1 and 2, an illustrative example of the present invention in installing a new resource to one of the exchanges coupled to the managing system will be described hereinafter. When new exchange resources are to be installed to one of the exchanges coupled to the switch system, an operator enters a RESOURCE INSTALLATION REQUEST message to the managing system 100 using the GUI 102. Upon the receipt of the RESOURCE INSTALLATION REQEUST message from the GUI 102 through the UIP 106 in step 200, the managing system 100 analyzes the received message using the SFP 108 to determine whether there is a base class corresponding the requested resources model in step 202. To this end, the SFP 108 determines whether the requested resource is available or whether the exchange (104/105) is capable of providing the service corresponding to the requested resource (i.e., whether the exchange is equipped to provide the smart card system. A predetermined look up table containing base classes with the kind of classes and the scope of the attribute values in each class is provided to make such determination. In the absence of such base class, the managing system 100 transmits an error message indicating a wrong resource installation request back to the operator through the GUI 102 in step 204.

On the other hand, in the presence of the base class in step 202, the managing system 100 determines the scope of a class to be processed by the SFP 108 in step 206, and determines whether the attribute values of the class satisfy the operator-requested condition through the FFP 110 in step 208. That is, the FFP 110, in step 208, determines one of the attribute corresponding to the determined class, as each class has a set of attributes which defines different properties of the class. In step 210, REP 112 generates an object instance to access and update the ODBMS and also sends the object instance to the exchange. If they do not satisfy the requested condition, the managing system 100 transmits an error message indicating the wrong resource installation request to the operator through the GUI 102 in step 204.

If the attribute values satisfy the requested condition in step 208, the managing system 100 generates an object instance for the corresponding resource and stores the object instance in the ODBMS 116 in step 210. Then, the managing system 100 transmits the requested resource information to the corresponding exchange 104 in step 212 and awaits a response from the exchange 104 in step 214. Thereafter, the exchange 104 recognizes that the new resources have been installed based on the received resource information and initiates the service relating to the new resources. By way of example, to install a new trunk card in the exchange 104, for example, the exchange 104 receives information about the new trunk card from the managing system 100, recognizes that the trunk card has been installed, and initiates a service related to the trunk card. Then, the exchange 104 transmits a response message. Upon receipt of the response message from the exchange 104 in step 216, the managing system 100 notifies the installation result to the operator through the GUI 102 in step 218.

As described above, a system for managing a plurality of exchanges using an object-oriented technique can manage each exchange independently and does not interfere with the call processing software as in the prior art switching system, thus improving the performance of the switching system.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention; rather, the present invention includes all embodiments falling within the scope of the appended claims.

What is claimed is:

1. An object-oriented system for integrally managing a plurality of exchanges, comprising:

a user interface processor for interfacing data with an operator;

an IPC conversion processor for interfacing data with the exchanges;

a scoping function processor for analyzing a resource installation request message received from the operator via the user interface processor, and for determining a base class responsive to the resource installation request message;

a filtering function processor for processing attribute values which satisfy the determined base class;

a resource installation processor for generating an object instance representative of the attribute values responsive to the determined base class, and for transmitting the object instance to one of the exchanges via the IPC conversion processor; and, an object data base management system for storing the object instance received from the resource installation processor.

2. The system as defined in claim 1, further comprising a graphic user interface for inputting the resource installation request message by the operator.

3. An exchange resource installing method in an object-oriented exchange managing system, comprising the steps of:

receiving a resource installation request message from an operator;

determining whether a base class responsive to the resource installation request message exists by analyzing the received message;

determining the scope of a class to be processed from the base class if the base class exists;

determining whether attribute values of the base class corresponds to the resource installation request message transmitted by the operator;

generating an object instance representative of the attribute values of the base class if the attribute values corresponds to the resource installation request message, and storing the generated object instance in an object data base management system (ODBMS);

transmitting the stored object instance to a corresponding exchange to initiate a service responsive to the stored object instance; and, notifying the initiation of the service to the operator.

4. The method of claim 3, further comprising the step of transmitting a command error message to the operator in the absence of the base class.

5. The method of claim 4, further comprising the step of transmitting a command error message to the operator if the attribute values do not satisfy the requested condition.

* * * * *